Aug. 15, 1950     J. G. LEE     2,518,697
HELICOPTER WITH ANTITORQUE TAIL JET
Filed Oct. 30, 1944     2 Sheets-Sheet 1
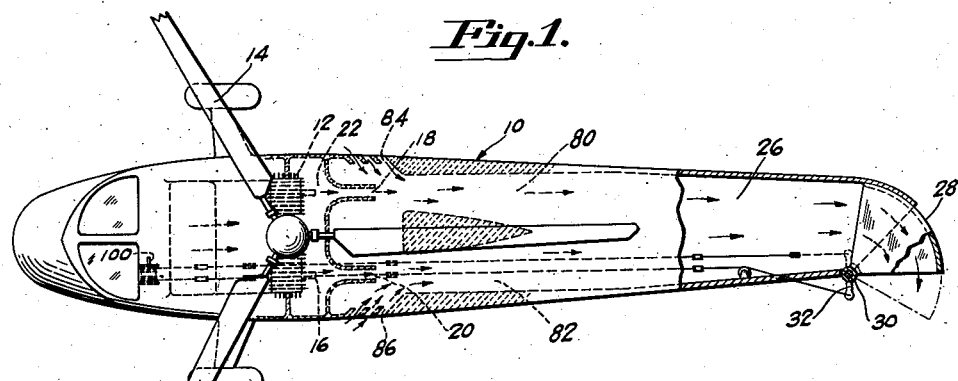
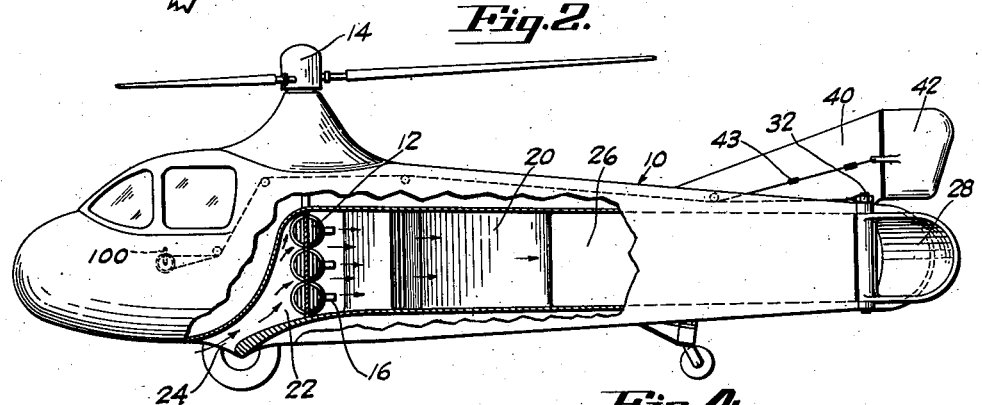
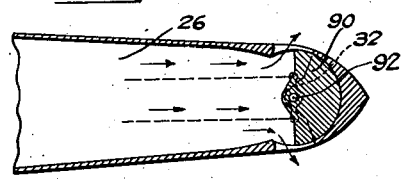
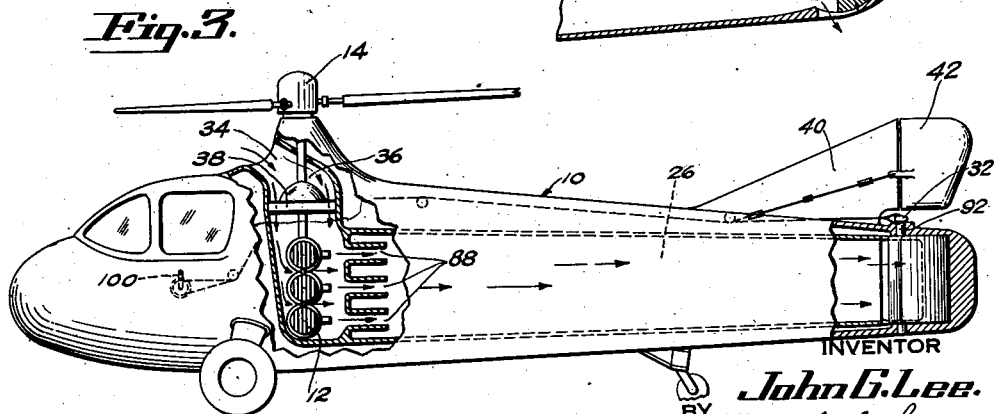
INVENTOR
John G. Lee.
BY Harris G. Luther
ATTORNEY Aug. 15, 1950  J. G. LEE  2,518,697
HELICOPTER WITH ANTITORQUE TAIL JET
Filed Oct. 30, 1944  2 Sheets-Sheet 2

INVENTOR
John G. Lee.
BY Harris G. Luther
ATTORNEY

Patented Aug. 15, 1950

2,518,697

UNITED STATES PATENT OFFICE 2,518,697

HELICOPTER WITH ANTITORQUE TAIL JET

John G. Lee, Farmington, Conn., assignor to United Aircraft Corporation, East Hartford, Conn., a corporation of Delaware Application October 30, 1944, Serial No. 560,970

1 Claim. (Cl. 244—17.19)

This application relates to helicopters and more particularly to the control of helicopters.

One object of the invention is the provision of improved means for opposing the torque reaction on a helicopter body which will be less of a hazard than the auxiliary rotor now commonly used.

Another object is the provision of improved means for producing a jet of fluid for controlling a helicopter.

Another object is the provision of improved means for controlling a jet of fluid to oppose the torque reaction on the helicopter body and to steer the helicopter.

Other objects and advantages will be apparent from the specification and claims and from the accompanying drawings which illustrate what is now considered to be a preferred embodiment of the invention.

In the drawings, Fig. 1 is a plan view and Fig. 2 is an elevation, with a portion thereof broken away, of a helicopter showing one form of jet producing and controlling mechanism.

Fig. 3 is a side elevation of a modification of the structure shown in Fig. 2 showing a fan for assisting in the production of the jet.

Fig. 4 is a detail of the jet control means of Fig. 3.

Figure 5:
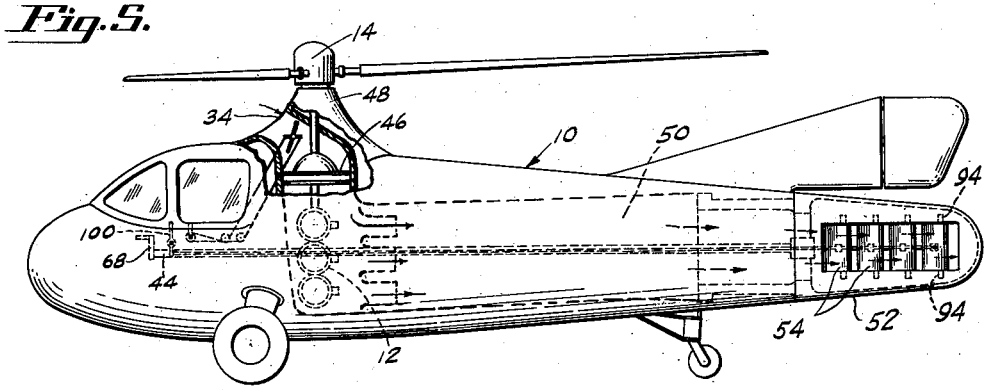
Fig. 5 is a side elevation of a helicopter showing another modification of the jet producing and controlling mechanism.

The engine torque, applied to the shaft of a single rotor helicopter, is accompanied by a torque reaction on the helicopter body. While the engine torque tends to rotate the helicopter rotor, the torque reaction tends to rotate the helicopter body. The torque reaction is a couple and may be neutralized only by another couple. In order to neutralize the torque reaction couple and control the rotation of the helicopter body, it is customary to provide the helicopter with a small auxiliary propeller located at the tail of the helicopter and producing one force of the opposing couple. The other force is provided by tipping the cone, or the line of action, of the lifting rotor slightly to one side. This auxiliary propeller presents a definite hazard which I propose to eliminate by using jets of fluid to provide the necessary force in place of the auxiliary propeller. The following specification describes a device for producing and controlling this jet in a helicopter in which the helicopter body, represented generally by the reference numeral 10, encloses an engine 12 which drives the helicopter rotor 14. This rotor may be of any well known type, such as one in which the blades are freely hinged and which is provided with both cyclical and total pitch control and may be connected with the engine through the usual reduction gear and clutch, none of which are shown as they are not necessary for an understanding of the present invention. The engine 12 is provided with exhaust stacks 16 which are directed rearwardly into augmenters formed by channels 18 and 20 in the helicopter body to the rear of the engine. The channels 18 and 20 are open at their front end to an engine compartment 22 which, as shown in Fig. 2, has an air-receiving opening 24 shown located beneath the helicopter. The opening 24 may, if desired, be located in other positions such as above or to the sides of the helicopter. The channels 18 and 20 expand as they progress rearwardly and emerge into a channel 26 in the tail of the helicopter. Channel 26 is provided at its rear end with a directing vane 28 hinged at 30 to move into and out of the tail of the helicopter when actuated by the control arm 32. The control arm 32 may be actuated by any desired means, such as a manually actuated lever 100 in the pilot's compartment, and appropriate cables or linkages.

As can be seen in Fig. 1, movement of the vane 28 will change the direction of the jet discharge from substantially normal to the longitudinal axis of the body 10 to a position forward of, or to a position rearward of, the normal position. In its extreme rearward direction, the jet may discharge substantially directly rearwardly.

In the construction just described, the exhaust directed by the stacks 16 into the augmenters creates jets of fluid which, passing through the channels 18, 20 greatly increase the volume of fluid and serve to assist in providing the pressure differential necessary to force cooling air past the engine cylinders. Thus, the control jet in the modification so far described consists of exhaust gases and engine cooling air.

The channels 18 and 20 may themselves discharge into augmenters 80 and 82 respectively which expand into the single channel 26 described above. The jets issuing from channels 18 and 20 into augmenters 80 and 82 create a pressure differential sufficient to draw in auxiliary air from outside the fuselage body 10 through openings 84 and 86, thus giving, in effect, a two-stage ejector or a two-stage augmenter for producing the control jet. The control jet will thus consist of exhaust gases, engine cooling air and auxiliary air. Openings 84 and 86 may be controlled by shutters if desired.

In formed flight, it may be possible to substantially dispense with any transversely directed jet and utilize the jet to assist in forward motion by the above described control. The torque reaction of the engine would then be compensated by providing the helicopter with a fixed fin 40 and a controllable rudder 42 controlled by cables 43 operated by the pilot through any desired means from the pilot's compartment. The fin and rudder also have utility in controlling the direction of flight in the power off condition when the helicopter is sustained by autorotation of the rotor. Although there is then no engine torque reaction to be compensated, there are no jets produced so that the fin and rudder constitute the sole yaw control. In hovering, however, the fixed fin 40 and rudder 42 would have insufficient effect to overcome engine torque reaction.

In the modification shown in Fig. 3, the cooling air inlet has been indicated as having an entrance 34 above the helicopter body. The entrance channel 36 is provided with a fan or blower 38 which may be driven by the engine 12 or, if desired, by a separate means, such as an electric motor. The volume of air delivered by the blower may be controlled by a throttle 48 such as shown in Fig. 5 or by flow directing vanes (not shown) or the blower may be driven through a variable speed drive (not shown). The remainder of the structure may be substantially that shown in Figs. 1 and 2, or the modified augmenter and directing vane shown in Fig. 3 may be utilized. In the modification shown in Fig. 3, the channels 18 and 20 of Figs. 1 and 2 are replaced by conduits forming individual augmenters 88 for each exhaust stack. No provision is shown in this view for supplying auxiliary air although it may be supplied, if desired. Also, if desired, a by-pass similar to by-pass 106 (Fig. 7) and a control therefor similar to valve 108 (Fig. 7) from channel 26 to the exterior of fuselage 10 may be provided to further control the volume of the jets controlled by vane 90.

The modified directing vane 90, shown in Figs. 3 and 4, is hinged at 92 and is controlled by arm 32 similar to the mounting and control of directing vane 28. Vane 90, however, is designed to direct jets to each side of the fuselage and not to the rear. Vane 90 acts as a sort of valve which, in the position shown in Fig. 4, directs substantially equal jets to each side of the fuselage. Movement of the valve in either direction from that shown will restrict the jet on one side and increase the jet on the other, thus controlling the extent and direction of torque compensation or side thrust.

The controllable rudder 42 may be actuated by the same cables which operate the vane 90, and from the same control lever 100. It will be necessary to cross the cables between the rudder and the vane cables so that the effects of the rudder and vanes, when simultaneously moved, will augment and not oppose each other.

Figure 6:
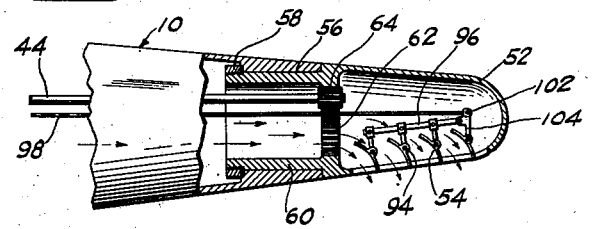
Fig. 6 is a detail of the jet controlling mechanism of Fig. 5.

In the structure shown in Fig. 5, the engine 12 is shown as having a driving connection with a blower 46 for providing the fluid jet. The engine exhaust may operate an ejector to aid the fan by pulling cooling air through the engine in a manner similar to that shown or the exhaust may be led directly outside the fuselage through separate stacks or a collector and exhaust pipe. Blower intake 34 is located in a position similar to that shown in Fig. 4 and is provided with a manually controlled throttle 48 for controlling the volume of the jet. The volume may, however, be controlled by a variable speed drive (not shown) or by adjustable flow directing vanes (not shown) for the blower 46. Blower 46 eventually discharges into a channel 50 which, in turn, discharges into the adjustable tail cone 52 containing adjustable directing vanes 54. It is apparent that the channel 50 diverges in an aft direction so that a diffuser effect is produced to convert the moving gases into a low velocity high mass flow similar to that achieved in the Fig. 1 construction. The tail cone 52 is rotatable around an axis extending substantially parallel with the longitudinal axis of the helicopter body to give the jet reaction a vertical component. As shown in Fig. 6, tail cone 52 is mounted on a bearing 56 and held in position by retaining means, such as nut 58 secured on the end of extension 60 of cone 52. An internal gear 62, fixed on the inside of tail cone 52, mates with a pinion 64 fixed on shaft 44 which is rotatable by crank 68 in the pilot's compartment to rotate the tail cone 52. When the jet is directed upwardly or downwardly from a horizontal position by rotation of the tail cone 52, a vertical force is provided which will balance changes in the center of gravity location or help incline the entire helicopter and the axis of the main rotor to cause a change in direction of movement of the helicopter.

The fore-and-aft direction and the volume of the jet issuing from cone 52 may be controlled by adjustable vanes 54. The vanes are mounted on pivots 94 and are interconnected by interconnecting rod 96. A control rod 98, actuated by a lever or other means 100, is connected by a universal joint such as a ball and socket joint 102 to an arm 104 rigidly secured to one of the vanes 54. Movement of lever 100 will thus simultaneously control all of the vanes 54 and connection 102 will permit rotation of cone 52 without affecting the position of vanes 54.

Figure 7:
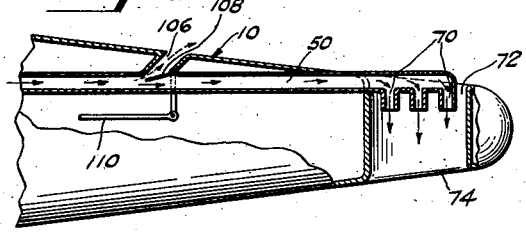
Fig. 7 shows an augmenter arranged at the tail of a helicopter for increasing the effectiveness of a jet.

Fig. 7 shows a modification of the structure shown in Fig. 5 in which a fixed jet is provided in the tail of the helicopter. The discharge of the blower or, alternately, the engine exhaust is directed by the channel 50 to a group of discharge nozzles 70 spaced from, but directed into, the entrance of a channel 72 and extending transversely of the tail of the helicopter. The discharge of fluid from the nozzle 70 is augmented by air drawn into the channel 72 so as to increase the volume of the jet issuing at 74. If desired, the nozzle 70 could be utilized in place of the vane 28 of Figs. 1, 2, and 3 or the vane 90 of Figs. 3 and 4 by connecting it with the discharge of the channel 26.

A by-pass 106, controlled by flap valve 108, is provided for the channel 50. Valve 108 may be controlled manually from the pilot's compartment through the control rod 110 to regulate the relative proportions of fluid directed to the jets 70 and the fluid directed out of the by-pass 106, thus controlling the amount of side thrust or torque compensation developed. If the blower is driven by the rotor so that it will be rotated whenever the rotor is rotated whether the rotor is driven by the engine or by autorotation, the fin 40 and rudder 42 will not be required, as a jet will always be available for control.

It is to be understood that the invention is not limited to the specific embodiment herein illustrated and described, but may be used in other ways without departure from its spirit as defined by the following claim.

I claim:

In a helicopter, in combination, a body having a tail portion extending along the longitudinal axis of said body, a sustaining rotor, an engine driving said rotor, a plurality of exhaust stacks for said engine, an augmenter, at least two of said exhaust stacks discharging into said augmenter so that cooling air is drawn over said engine and mixed with the exhaust from said engine to make a high velocity fluid, means for directing said fluid through said tail portion and for changing the high velocity low pressure energy of said fluid into low velocity high pressure energy, means for counteracting one component of torque of said rotor and for effecting yaw moments, comprising, means cooperating with said tail portion for directing said fluid transversely to and upwardly and downwardly from said longitudinal axis, means for controlling the magnitude of the reaction of said jet, comprising an engine driven blower, a duct leading to said blower and receiving air externally of said helicopter including a valve therein, said blower discharging into said tail portion and a plurality of controllable vanes for varying the direction of said fluid jet in a fore and aft direction.

JOHN G. LEE.

REFERENCES CITED

The following references are of record in the file of this patent:

UNITED STATES PATENTS

| Number | Name | Date |
| --- | --- | --- |
| 1,572,812 | Rees | Feb. 9, 1926 |
| 1,623,613 | Arndt | Apr. 5, 1927 |
| 1,642,752 | Landon | Sept. 20, 1927 |
| 1,909,450 | Bleecker | May 16, 1933 |
| 1,922,167 | Leray | Aug. 15, 1933 |
| 2,135,073 | Gerhardt | Nov. 1, 1938 |
| 2,177,499 | Schairer | Oct. 24, 1939 |
| 2,318,259 | Sikorsky | May 4, 1943 |
| 2,369,652 | Avery | Feb. 20, 1945 |
| 2,390,161 | Mercier | Dec. 4, 1945 |
| 2,503,172 | Pullin | Apr. 4, 1950 |

FOREIGN PATENTS

| Number | Country | Date |
| --- | --- | --- |
| 403,730 | France | Oct. 2, 1909 |
| 687,482 | France | Apr. 28, 1930 |
| 818,703 | France | June 21, 1937 |
| 883,462 | France | Mar. 22, 1943 |
| 556,866 | Great Britain | Oct. 26, 1943 |